(12) United States Patent
Zeng et al.

(10) Patent No.: US 11,922,248 B2
(45) Date of Patent: Mar. 5, 2024

(54) SMART CARD

(71) Applicant: GIESECKE+DEVRIENT MOBILE SECURITY GMBH, Munich (DE)

(72) Inventors: Teng Zeng, Hubei (CN); Chen Fang, Hubei (CN); Wensheng Zhu, Hubei (CN)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 0 days.

(21) Appl. No.: 17/801,432

(22) PCT Filed: Feb. 20, 2021

(86) PCT No.: PCT/CN2021/077018
§ 371 (c)(1),
(2) Date: Aug. 22, 2022

(87) PCT Pub. No.: WO2021/164758
PCT Pub. Date: Aug. 26, 2021

(65) Prior Publication Data
US 2023/0085343 A1  Mar. 16, 2023

(30) Foreign Application Priority Data
Feb. 21, 2020 (CN) .......................... 202020197177.6

(51) Int. Cl.
*G06K 19/06* (2006.01)
*G06K 19/077* (2006.01)

(52) U.S. Cl.
CPC .............. *G06K 19/07722* (2013.01)

(58) Field of Classification Search
CPC .......... G06K 19/07722; G06K 19/077; G06K 19/0723; G06K 19/0772; G06K 19/06196;
(Continued)

(56) References Cited

U.S. PATENT DOCUMENTS

| 8,490,866 | B1 | 7/2013 | Aibazov |
| 2005/0109850 | A1* | 5/2005 | Jones ............... G06K 19/10 |
| | | | 235/487 |

(Continued)

FOREIGN PATENT DOCUMENTS

| CN | 202826799 U | 3/2013 |
| CN | 203164994 U | 8/2013 |

(Continued)

OTHER PUBLICATIONS

International Search Report from Corresponding PCT Application No. PCT/CN2021/077018, dated May 26, 2021.

*Primary Examiner* — Daniel St Cyr
(74) *Attorney, Agent, or Firm* — Workman Nydegger

(57) ABSTRACT

The invention relates to a smart card, which includes: a card body, having an accommodating recess extending along its own thickness direction of the card body; a decorative part, at least part of the decorative part being embedded in the accommodating recess; in which the decorative part includes a base layer and decorative pieces, more than two decorative pieces are arranged on the base layer, the base layer is connected to the card body, the decorative pieces correspond to the accommodating recess along the thickness direction and are exposed to an external environment. The smart card of the invention can improve the stereoscopic sense, individuation and noble sense of the smart card by arranging the decorative parts with decorative pieces on the card body.

10 Claims, 3 Drawing Sheets

(58) Field of Classification Search
CPC ...... G06K 19/18; G06K 19/07; G06Q 20/341; G06Q 20/3278
USPC .................................... 235/482, 487, 492
See application file for complete search history.

(56) References Cited

U.S. PATENT DOCUMENTS

| | | | |
|---|---|---|---|
| 2005/0161512 A1* | 7/2005 | Jones ................ | H04N 1/32133 235/487 |
| 2016/0232438 A1* | 8/2016 | Williams ................ | C04B 35/80 |
| 2017/0316300 A1* | 11/2017 | Herslow ............... | C25D 11/243 |
| 2017/0344870 A1* | 11/2017 | Williams .............. | C04B 35/488 |
| 2018/0025261 A1* | 1/2018 | Mosteller ............. | B32B 15/085 235/375 |
| 2018/0339503 A1* | 11/2018 | Finn ..................... | H01Q 1/2225 |
| 2023/0085343 A1 | 3/2023 | Zeng et al. | |

FOREIGN PATENT DOCUMENTS

| | | |
|---|---|---|
| CN | 211427375 U | 9/2020 |
| KR | 20090072474 A | 7/2009 |
| KR | 20140072930 A | 6/2014 |

* cited by examiner

SMART CARD

TECHNICAL FIELD

The invention relates to a technical field of smart cards, in particular to a smart card.

BACKGROUND

With the economic globalization, smart cards have been widely used. Smart cards can realize a function of electronic transaction, thereby providing payment convenience for people's daily life. In prior arts, due to the regulations of national standards and international standards, if a smart card needs to be personalized or recognizable, this can only be realized by changing the printed patterns. However, such way of design is simple, and has a poor stereoscopic sense, therefore demands of personalized trends may not be satisfied.

SUMMARY

The invention provides a smart card, which can improve the stereoscopic sense, individuation and noble sense of the smart card by arranging a decorative part with decorative pieces on a card body.

In one aspect, the invention provides a smart card, and the smart card includes the following:

A card body, having an accommodating recess extending along its own thickness direction;

A decorative part, at least part of the decorative part being embedded in the accommodating recess; in which the decorative part includes a base layer and decorative pieces, more than two decorative pieces are arranged on the base layer, the base layer is connected to the card body, and the decorative pieces correspond to the accommodating recess along the thickness direction and are exposed to an external environment.

According to one aspect of the invention, the base layer is a flexible structure.

According to one aspect of the invention, the decorative part further includes a first adhesive layer, the base layer and the first adhesive layer are stacked along the thickness direction, and the first adhesive layer adheres the base layer and the decorative part.

According to one aspect of the invention, the decorative part further includes a filler which fills a gap between two adjacent decorative pieces and is connected to the base layer.

According to one aspect of the invention, the decorative piece is at least one of diamonds, gems or jade; and/or the filler is a metal spherical structure.

According to one aspect of the invention, a height of the decorative part protruding from an opening of the accommodating recess is less than or equal to 0.46 mm.

According to one aspect of the invention, the smart card further includes a second adhesive layer, which is arranged between the base layer and the card body and adheres the base layer and the card body.

According to one aspect of the invention, the decorative part further includes an embedding flange, which is arranged on a side surface of the base layer, and crosses a side wall of the accommodating recess and is embedded in the card body.

According to one aspect of the invention, the card body has a to-be-embedded gap, the to-be-embedded gap communicates with the accommodating recess, and the embedding flange is embedded in the to-be-embedded gap.

According to one aspect of the invention, the card body includes more than three layer structures, which are stacked along the thickness direction, and the accommodating recess extends on at least two of the layer structures; and/or a cross-sectional profile size of the accommodating recess is enlarged by 0.15 mm on the basis of a cross-sectional profile size of a part of the base layer located within the accommodating recess.

According to the smart card provided by the invention, a fixed decorative part is installed within the accommodating recess of the card body. More than two decorative pieces are arranged on the decorative parts. The decorative pieces on the smart card can improve the overall beauty of the smart card, as well as the noble texture and stereoscopic sense of the smart card, and also can highlight the individuation of the card-holder.

BRIEF DESCRIPTION OF THE DRAWINGS

The following will describe the features, advantages and technical effects of the exemplary embodiments of the invention with reference to the drawings, in which.

Figure 1:
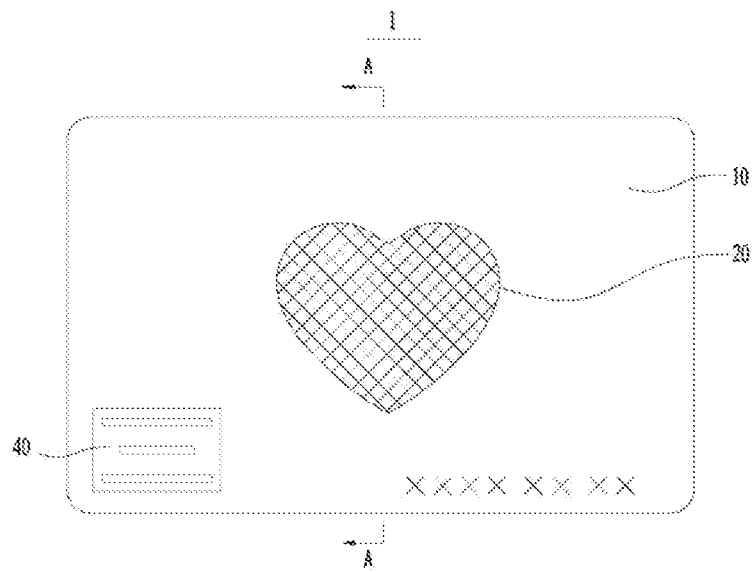
FIG. 1 is a structural schematic diagram of a top view of a smart card disclosed in an embodiment of the invention.

In the drawings, the drawings are not necessarily drawn to actual scale.

REFERENCE NUMBER

1: Smart Card;
10: Card Body;
10a: Accommodating Recess;
10b: To-be-embedded Gap;
11: First Adhesive Film Layer;
12: First Printed Graphic Layer;
13: First Printed Substrate Layer;
14: Loop Antenna Layer;
15: Antenna Substrate Layer;
16: Second Printed Substrate Layer;
17: Second Printed Graphic Layer;
18: Second Adhesive Film Layer;
20: Decorative Parts;
21: Base Layer;
22: Decorative Pieces;
23: First Adhesive Layer;
24: Filler;
25: Embedding Flange;
30: Second Adhesive Layer;
40: Anti-Counterfeit Label;
50: Signature Strip;
60: Magnetic Strip; and
X: Thickness Direction.

DETAILED DESCRIPTION

The implementations of the invention will be further described in detail with reference to drawings and embodiments. The following detailed description of embodiments and drawings are used to illustrate the principle of the invention, but may not be used to limit the scope of the invention, that is, the invention is not limited to the described embodiments.

In the description of the invention, it should be noted that, unless otherwise specified, "a plurality of" means more than two; the orientation or position relationships indicated by the terms "upper", "lower", "left", "right", "inner" and "outer" are only for the convenience of describing the invention and simplifying the description, but do not indicate or imply that the referred devices or elements must have a specific orientation, be constructed and operated in a specific orientation, therefore they may not be understood as limiting the invention. In addition, the terms "first", "second", etc. are only used for the purpose of description and may not be understood as indicating or implying relative importance.

In the description of the invention, it should also be noted that unless otherwise specified and limited, the terms "install", "connect with . . . " and "connect to . . . " should be understood in a broad sense, for example, they may be fixed connection, detachable connection or integrated connection; and may be direct connection or indirect connection through an intermediate medium. For ordinary technicians in the field, the specific meanings of the above terms in the invention may be understood depending on specific conditions.

In order to better understand the invention, the embodiments of the invention will be described with reference to FIGS. 1 to 6.

Referring to FIG. 1, an embodiment of the invention provides a smart card 1. The smart card 1 may be used to realize a function of electronic transaction. Smart card 1 is a kind of card with a predetermined length, width and thickness, and has good portability and convenience in use. The smart card 1 may be a financial card, a credit card, a stored value card, a bus card, an access card or a membership card, but not limited to the card types listed above. In an example, according to the standard specification, a thickness of the smart card 1 needs to meet a standard thickness of 0.76 mm (millimeter) to 0.84 mm to ensure the normal usage of the smart card 1.

Figure 2:
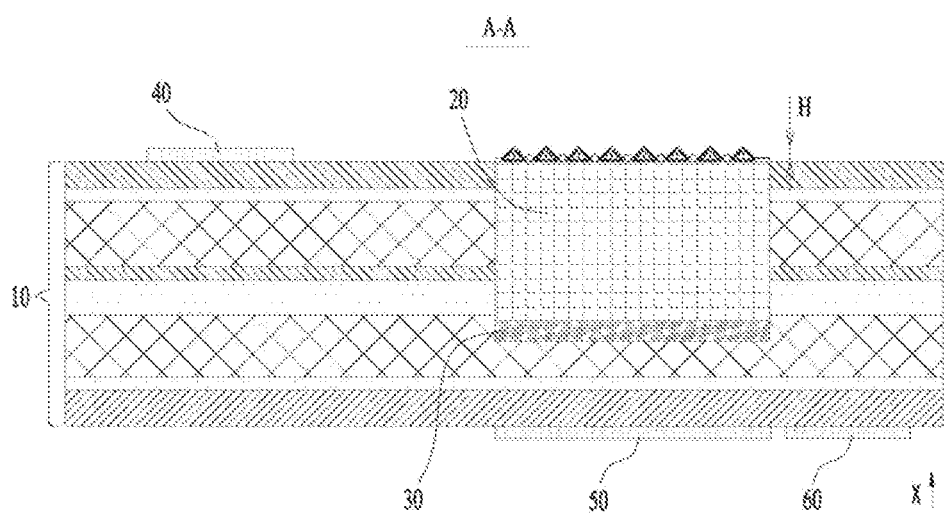
FIG. 2 is a sectional structural schematic diagram taken along A-A direction in FIG. 1.
Figure 3:
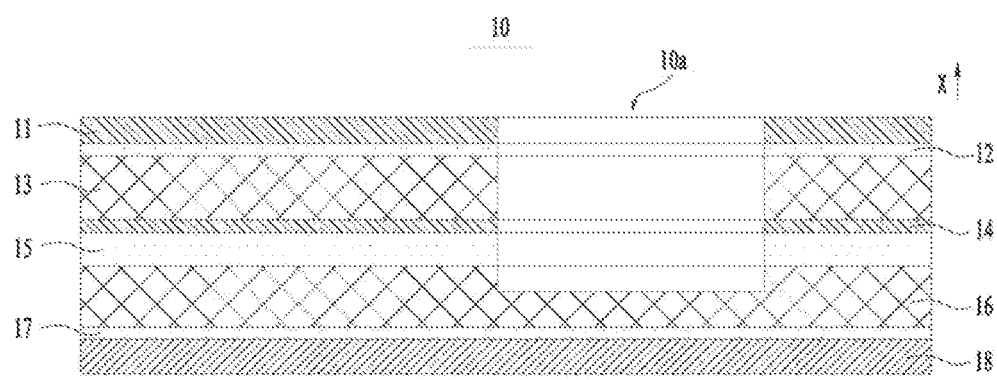
FIG. 3 is a sectional structural schematic diagram of a card body disclosed in an embodiment of the invention.
Figure 4:
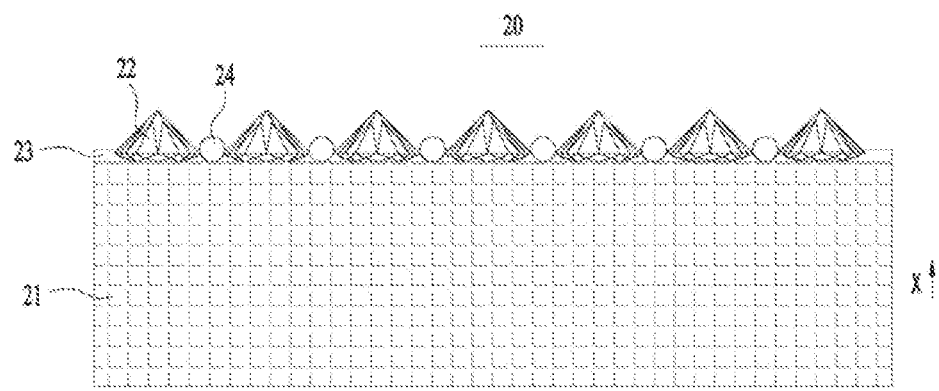
FIG. 4 is a sectional structural schematic diagram of a decorative part disclosed in an embodiment of the invention.

Referring to FIG. 2 and FIG. 3, the smart card 1 according to the embodiment of the present invention includes a card body 10 and a decorative part 20 that is embedded in the card body 10. The card body 10 has an accommodating recess 10a extending along its own thickness direction X. Referring to FIG. 1, the card body 10 has an upper surface and a lower surface. The accommodating recess 10a extends from the upper surface towards the lower surface. At least part of the decorative part 20 is embedded in the accommodating recess 10a. Referring to FIG. 4, the decorative part 20 includes a base layer 21 and decorative pieces 22. More than two decorative pieces 22 are arranged on the base layer 21. The base layer 21 is connected to the card body 10. The decorative pieces 22 correspond to the accommodating recess 10a along the thickness direction X and are exposed to an external environment, so that the decorative pieces 22 may be observed visually.

According to the smart card 1 provided by the invention, a fixed decorative part 20 is installed within the accommodating recess 10a of the card body 10. More than two decorative pieces 22 are arranged on the decorative part 20. The decorative pieces 22 arranged on the smart card 1 can improve the overall aesthetic of the smart card 1, as well as the noble texture and stereoscopic sense of the smart card 1, and also can highlight the individuation of the card-holder.

In the embodiment of this invention, the accommodating recess 10a is manufactured on the smart card 1 in advance, and then the decorative part 20 is installed within the accommodating recess 10a, and a pressing process is performed to fix the card body 10 with the decorative part 20. Since one decorative part 20 includes more than two decorative pieces 22, the installation work of more than two decorative pieces 22 can be completed by fixing one decorative part 20 on the card body 10. On the one hand, compared with the assembly way of inlaying and installing one decorative piece 22 within one accommodating recess 10a, the structural design of this embodiment can improve the efficiency of inlaying the decorative pieces 22. On the other hand, in prior arts, it is necessary to pre-process an inlay hole matching a shape of the decorative pieces 22 in the outermost layer of the card body 10, and then inlay the decorative pieces 22 into the inlay hole. However, in this way, the processing accuracy of flatness, smoothness and regularity of the inlay hole is required to be high. And the shape of the inlay hole needs to match the decorative pieces 22, otherwise, the decorative pieces 22 cannot be inlaid or easily falls off from the card body 10. In the structural design of this embodiment, it is only necessary to install the decorative part 20 with the decorative pieces 22 into the accommodating recess 10a, and then connect and fix the base layer 21 with the card body 10, so that the requirements for the processing accuracy of the accommodating recess 10a are reduced.

In one embodiment, as shown in FIG. 3, the card body 10 includes eight layer structures, namely, a first adhesive film layer 11, a first printed graphic layer 12, a first printed substrate layer 13, a loop antenna layer 14, an antenna substrate layer 15, a second printed substrate layer 16, a second printed graphic layer 17 and a second adhesive film layer 18. Each of the layer structures are stacked to each other. In this embodiment, the first adhesive film layer 11 may act as a front surface of the card body 10, and the second adhesive film layer 18 may act as a back surface of the card body 10. The accommodating recess 10a extends on the first adhesive film layer 11, the first printed graphic layer 12, the first printed substrate layer 13, the loop antenna layer 14, the antenna substrate layer 15 and the second printed substrate layer 16. It can be understood that a number of layer structures included in the card body 10 is not limited to the above number, and can be set to other numbers according to product requirements, but the number of layer structures is not less than three. The accommodating recess 10a may extend in a part of all the layer structures without penetrating the card body 10. It can be understood that the accommodating recess 10a may also penetrate all the layer structures. In one example, after pressing respective layer structures together to form the card body 10, the card body 10 is processed by using an equipment to form the accommodating recess 10a. Or, hole-structures are pre-processed on the corresponding layer structures, so that after respective layer structures being pressed together to form the card body 10, the accommodating recess 10a is formed collectively by respective hole-structure.

In one embodiment, the number of the decorative parts 20 may be but not limited to one. According to product requirements, more than two decorative parts 20 may be arranged on the card body 10. The shape and pattern of each decorative part 20 may be customized according to requirements. Or, two or more decorative parts 20 are spliced to form a desired shape and pattern.

In one embodiment, as shown in FIG. 4, the decorative part 20 further includes a first adhesive layer 23. The base layer 21 and the first adhesive layer 23 are stacked along the thickness direction X. The first adhesive layer 23 adheres the base layer 21 and the decorative pieces 22. In one example, the first adhesive layer 23 is a glue layer. The base layer 21 smaller than the area of the card body 10 is selected in advance, then glue is coated on the base layer 21 in advance by using a glue coating equipment, then more than two decorative pieces 22 are tiled on the coated glue by using an equipment, and finally the manufacture of the decorative part 20 is completed by pressing and curing. In prior arts, a predetermined amount of glue needs to be dripped into the inlay hole pre-provided in the card body 10, and then one decorative piece 22 is inlaid in the inlay hole. At this time, the glue is easy to overflow, thereby affecting the appearance quality of the smart card 1. In this embodiment, since the glue is coated on a surface of the base layer 21 in a large area, the accuracy and difficulty of glue coating may be reduced, and the accuracy requirements for the usage amount of the glue may also be reduced, thereby improving the appearance quality of the decorative part 20 after using glue, and further improving the appearance quality of the smart card 1.

In one embodiment, as shown in FIG. 4, the decorative part 20 further includes a filler 24. The filler 24 fills a gap between two adjacent decorative pieces 22 and is connected to the base layer 21, which reduces the possibility that the aesthetic is lowered or the decorative pieces 22 are prone to swing from side to side and then fall off due to the gap between two adjacent decorative pieces 22. In an example, a plurality of decorative pieces 22 may be laid on the base layer 21 in rows and columns, or may be laid on the base layer 21 irregularly. In one example, in an embodiment where the decorative part 20 includes the first adhesive layer 23, the filler 24 is adhered to the first adhesive layer 23, thereby being connected with the base layer 21 through the first adhesive layer 23. In one example, the filler 24 is a metal spherical structure. Since the plurality of decorative pieces 22 are laid on the first adhesive layer 23 and then the fillers 24 are sprinkled on the decorative pieces 22, it is easier for a spherical filler 24 to roll into the gap between the two decorative pieces 22 by itself. In addition, the spherical filler 24 has a smooth surface without edges and corners, so that it is not easy to scratch and damage a surface of the decorative pieces 22. The material of the filler 24 is selected as metal, and the beauty and texture may be improved by the metal color of the filler 24. Optionally, the filler 24 is a steel spherical structure. In one example, the decorative pieces 22 are diamonds. Types of diamonds include, but are not limited to, a flat diamond and a sharp diamond. The diamond can be, but not limited to, a crystal diamond. It can be understood that, the decorative pieces 22 are not limited to the diamonds described above, but may also be gems or jade. Or, when the number of decorative pieces 22 are multiple, the decorative pieces 22 can be a free combination of diamonds, gems and jade to present different textures and impressions.

In one embodiment, the base layer 21 is a flexible structure. Optionally, the material of the base layer 21 may be rubber or silica gel.

In one embodiment, as shown in FIG. 2, a depth of the accommodating recess 10a needs to be jointly determined according to a thickness of the card body 10, a limitation of the card reader device and a thickness of the decorative part 20. In this embodiment, a height H of the decorative part 20 protruding from an opening of the accommodating recess 10a is less than or equal to 0.46 mm, so as to reduce the possibility that the smart card 1 cannot be normally used on a terminal equipment by being inserted.

In one embodiment, on the basis of a cross-sectional profile size of a part of the base layer 21 located within the accommodating recess 10a, a cross-sectional profile size of the accommodating recess 10a is enlarged outward by 0.15 mm. Here, a depth direction of the accommodating recess 10a is the same as the thickness direction X. The cross section refers to a plane formed by cutting along a direction perpendicular to the thickness direction X. In this way, because the cross-sectional profile size of the accommodating recess 10a is larger than that of the part of the base layer 21 located within the accommodating recess 10a, the base layer 21 can be smoothly embedded in the accommodating recess 10a, and the possibility that the base layer 21 cannot be completely embedded in the accommodating recess 10a due to a slope of a side wall of the accommodating recess 10a is reduced.

In one embodiment, as shown in FIG. 2, the smart card 1 further includes a second adhesive layer 30. The second adhesive layer 30 is arranged between the base layer 21 and the card body 10. The second adhesive layer 30 adheres the base layer 21 and the card body 10. The base layer 21 and the card body 10 are connected and fixed by the way of adhesion, which can reduce the difficulty of connection between the base layer 21 and the card body 10. In one example, the second adhesive layer 30 may be a double-sided adhesive layer. After the manufacture of the decorative part 20 is completed, the second adhesive layer 30 is arranged on a side of the base layer 21 away from the decorative pieces 22. The decorative part 20 and the second adhesive layer 30 are installed in the accommodating recess 10a of the card body 10 together. After a pressing process, the second adhesive layer 30 is firmly adhered to an inner wall of the accommodating recess 10a. Before the decorative part 20 is connected to the card body 10, a removable protective layer is attached to a surface of the double-sided adhesive layer away from the base layer 21, thereby reducing the possibility of fouling caused by exposure of the double-sided adhesive layer to an external environment. Optionally, the protective layer is a release paper layer. Before installing the decorative part 20, the protective layer is peeled off. In another example, the second adhesive layer 30 may be a glue layer. The glue is applied to a corresponding area of the inner wall of the accommodating recess 10a of the card body 10, and then the decorative part 20 is installed within the accommodating recess 10a, and finally the decorative part 20 is fixed to the card body 10 by glue adhesion. Optionally, the second adhesive layer 30 is provided between a surface of the base layer 21 away from the decorative pieces 22 and a bottom wall of the accommodating recess 10a. And/or the second adhesive layer 30 is provided between an outer peripheral side surface of the base layer 21 and the side wall of the accommodating recess 10a.

Figure 5:
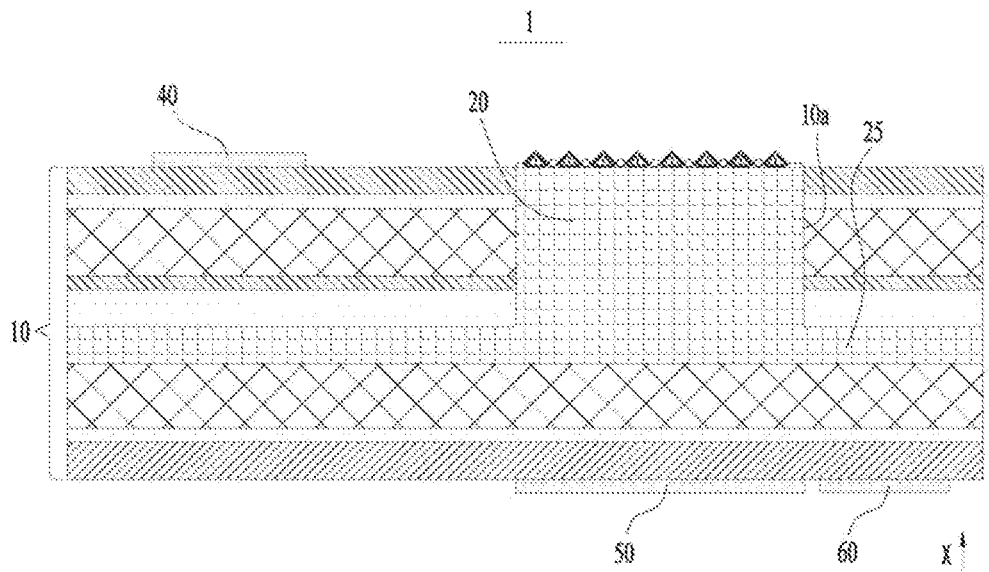
FIG. 5 is a schematic sectional structure diagram of a smart card disclosed in an embodiment of the invention.
Figure 6:
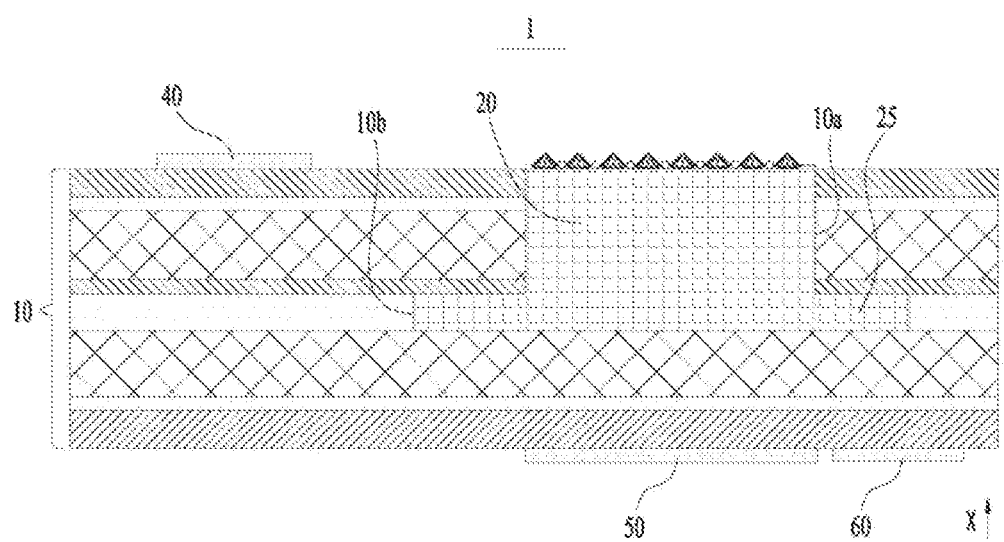
FIG. 6 is a schematic sectional structure diagram of a smart card disclosed in another embodiment of the invention.

In one embodiment, as shown in FIG. 5 or FIG. 6, the decorative part 20 further includes an embedding flange 25. The embedding flange 25 is arranged on a side surface of the base layer 21. The embedding flange 25 crosses a side wall of the accommodating recess 10a and is embedded in the card body 10. Since the embedding flange 25 is embedded in the card body 10, the connection stability between the base layer 21 and the card body 10 is effectively ensured, so that the base layer 21 is not easy to fall out of the accommodating recess 10a. In one example, a manufacturing process of the smart card 1 includes setting a via in corresponding layer structures in the card body 10 in advance.

During the process of stacking respective layer structures of the card body 10, the decorative parts 20 are arranged at corresponding positions, and then the layer structures with vias are sequentially sleeved on the base layer 21 of the decorative parts 20. The embedding flange 25 extends beyond a side wall of the via and is embedded between two adjacent layers. After respective layer structures are stacked, the smart card 1 is manufactured by hot pressing process. In one example, the embedding flange 25 is an annular structure. The embedding flange 25 extends along the circumferential direction of the base layer 21 to surround the base layer 21. Optionally, the embedding flange 25 and the base layer 21 are integrally formed.

In one example, as shown in FIG. 5, the embedding flange 25 fills between two adjacent layer structures in the card body 10 and isolates the two adjacent layer structures. The embedding flange 25 penetrates the card body 10 along a length direction and/or a width direction. The length direction and width direction are perpendicular to the thickness direction X. Along the thickness direction X, an outer edge of the embedding flanges 25 is aligned with the outer edges of other layers. In another example, as shown in FIG. 6, the card body 10 has a to-be-embedded gap. The to-be-embedded gap communicates with the accommodating recess 10a. The embedding flange 25 is embedded in the to-be-embedded gap. Optionally, the to-be-embedded gap does not penetrate through the card body 10 in the length direction and the width direction.

In one embodiment, as shown in FIG. 6, the opening of the accommodating recess 10a is arranged on a surface of the first adhesive film layer 11 facing an external environment. An anti-counterfeit label 40 is arranged on an outward surface of the first adhesive film layer 11. A signature strip 50 and a magnetic stripe 60 are arranged on a surface of the second adhesive film layer 18 facing the external environment.

The smart card 1 of the embodiment of the invention includes a card body 10 and a decorative part 20. The card body 10 and the decorative part 20 are separately processed accessories, and then they are assembled. The card body 10 is provided with a accommodating recess 10a. The decorative part 20 includes a base layer 21 and more than two decorative pieces 22 arranged on the base layer 21. The decorative part 20 is embedded in the accommodating recess 10a. The base layer 21 is fixedly connected to the card body 10. The decorative pieces 22 can improve the individuation, beauty and noble sense of the smart card 1. If one decorative part 20 is arranged on the card body 10, more than two decorative parts 22 can be installed and fixed at the same time, thus improving the efficiency of inlaying the decorative parts 22.

Although the invention has been described with reference to the preferred embodiments, without departing from the scope of the invention, various improvements can be made to it and its components can be replaced by equivalents, especially, as long as there is no structural conflict, the technical features mentioned in respective embodiments may be combined in any way. The invention is not limited to the specific embodiments disclosed herein, but includes all technical solutions falling within the scope of the claims.

The invention claimed is:

1. A smart card, comprising:
a card body, having an accommodating recess extending along its own thickness direction; and
a decorative part, at least part of the decorative part being embedded in the accommodating recess;
wherein the decorative part includes a base layer and decorative pieces, more than two decorative pieces are arranged on the base layer, the base layer is connected to the card body, and the decorative pieces correspond to the accommodating recess along the thickness direction and are exposed to an external environment above a top surface of the card body;
wherein the accommodating recess is configured and dimensioned to receive the base layer from a top surface of the card body, the accommodating recess having a depth from the top surface formed short of a thickness of the card body;
wherein the decorative pieces are stacked on the base layer in the thickness direction such that the base layer extends from a recess surface of the accommodating recess in the thickness direction toward the top surface of the card body.

2. The smart card according to claim 1, wherein the base layer is a flexible structure.

3. The smart card according to claim 1, wherein the decorative part further includes a first adhesive layer, the base layer and the first adhesive layer being stacked along the thickness direction, and the first adhesive layer adhering the base layer and the decorative pieces.

4. The smart card according to claim 1, wherein the decorative part further includes a filler, the filler filling a gap between two adjacent decorative pieces and being connected to the base layer.

5. The smart card according to claim 4, wherein the decorative piece is at least one of diamonds, gems or jade; and/or the filler is a metal spherical structure.

6. The smart card according to claim 1, wherein a height of the decorative part protruding from an opening of the accommodating recess is less than or equal to 0.46 mm.

7. The smart card according to claim 1, wherein the smart card further includes a second adhesive layer, the second adhesive layer being arranged between the base layer and the card body and adhering the base layer and the card body.

8. The smart card according to claim 1, wherein the decorative part further includes an embedding flange, the embedding flange being arranged on a side surface of the base layer and crossing a side wall of the accommodating recess and being embedded in the card body.

9. The smart card according to claim 8, wherein the card body has a to-be-embedded gap, the to-be-embedded gap communicating with the accommodating recess, and the embedding flange being embedded in the to-be-embedded gap.

10. The smart card according to claim 1, wherein the card body includes more than three-layer structures, the more than three-layer structures being stacked along the thickness direction, and the accommodating recess extending on at least two of the layer structures; and/or
a cross-sectional profile size of the accommodating recess being enlarged by 0.15 mm on the basis of a cross-sectional profile size of a part of the base layer located within the accommodating recess.

* * * * *